(12) United States Patent
Herman et al.

(10) Patent No.: US 9,535,915 B2
(45) Date of Patent: Jan. 3, 2017

(54) IMMEDIATE RECOVERY OF VIRTUAL MACHINE USING DEDUPLICATION DEVICE AND SNAPSHOTS

(71) Applicant: Quantum Corporation, San Jose, CA (US)

(72) Inventors: Barry Herman, San Jose, CA (US); Greg Wade, San Jose, CA (US); Gerald Simon, San Jose, CA (US); John LaRue, Burlington, VT (US)

(73) Assignee: Quantum Corporation, San Jose, CA (US)

( * ) Notice: Subject to any disclaimer, the term of this patent is extended or adjusted under 35 U.S.C. 154(b) by 348 days.

(21) Appl. No.: 14/328,747

(22) Filed: Jul. 11, 2014

(65) Prior Publication Data
US 2016/0012071 A1    Jan. 14, 2016

(51) Int. Cl.
*G06F 17/30* (2006.01)
*G06F 3/06* (2006.01)
*G06F 11/14* (2006.01)

(52) U.S. Cl.
CPC .......... *G06F 17/30088* (2013.01); *G06F 3/06* (2013.01); *G06F 11/1438* (2013.01); *G06F 17/302* (2013.01); *G06F 11/1453* (2013.01); *G06F 11/1484* (2013.01)

(58) Field of Classification Search
CPC ................. G06F 17/30088; G06F 11/1438
See application file for complete search history.

(56) References Cited

U.S. PATENT DOCUMENTS

| | | | | |
|---|---|---|---|---|
| 7,454,583 B2 * | 11/2008 | Yagisawa | ............ | G06F 11/1435 711/162 |
| 8,060,476 B1 * | 11/2011 | Afonso | ............... | G06F 11/1451 707/649 |
| 8,495,316 B2 * | 7/2013 | Nagarkar | ............ | G06F 9/45533 711/162 |
| 8,843,443 B1 * | 9/2014 | Xing | .................. | G06F 11/1438 707/639 |
| 8,850,146 B1 * | 9/2014 | Majumdar | .............. | G06F 12/08 707/649 |
| 9,229,951 B1 * | 1/2016 | Xing | ................. | G06F 17/30088 |

(Continued)

OTHER PUBLICATIONS

Yang, On Optimization of Virtual Machine Live Stirage Migration for the Cloud, Jul. 2016, 134 page.*

*Primary Examiner* — Noosha Arjomandi

(57) ABSTRACT

Example apparatus and methods use two types of storage to improve boot time associated with recovering a virtual machine running on a hypervisor. The first storage is deduplication based and the second storage is not deduplication based. Example apparatus and methods may read data from the first storage to support operations immediately upon the VM booting and until a full recovery has been completed. Example apparatus and methods may also write a snapshot to the second storage and then support random input/output for the virtual machine from the snapshot in the second storage immediately upon the VM booting until a full recovery has been completed. Having dual devices facilitates using deduplication storage for deduplication-centric I/O while non-deduplication storage is used for random I/O while transfer of a recovery image from a backup device to a primary device associated with the VM is completed.

10 Claims, 8 Drawing Sheets

(56) References Cited

U.S. PATENT DOCUMENTS

| | | | |
|---|---|---|---|
| 2007/0220246 A1* | 9/2007 | Powell | G06F 9/45533 |
| | | | 713/2 |
| 2008/0126699 A1* | 5/2008 | Sangapu | G06F 11/1435 |
| | | | 711/114 |
| 2012/0144391 A1* | 6/2012 | Ueda | G06F 9/45558 |
| | | | 718/1 |
| 2014/0188805 A1* | 7/2014 | Vijayan | G06F 11/1453 |
| | | | 707/646 |
| 2015/0039577 A1* | 2/2015 | Talagala | G06F 9/467 |
| | | | 707/703 |
| 2015/0212893 A1* | 7/2015 | Pawar | G06F 11/1448 |
| | | | 707/649 |
| 2016/0004721 A1* | 1/2016 | Iyer | G06F 17/30088 |
| | | | 707/649 |
| 2016/0170881 A1* | 6/2016 | Guthrie | G06F 9/45558 |
| | | | 711/143 |

* cited by examiner

IMMEDIATE RECOVERY OF VIRTUAL MACHINE USING DEDUPLICATION DEVICE AND SNAPSHOTS

BACKGROUND

Processing and input/output for a generic boot of a generic virtual machine (VM) is different than processing and input/output (I/O) for recovering a VM from a backup image. Although there is a large overlap between the processing and I/O in the two scenarios, there is additional specific data movement required in the recovery scenario. In addition to data reads associated with booting the VM, and random I/O that occurs during or soon after the VM is instantiated, data has to be moved from the backup image to a primary data store to create a recovery image. Conventionally this data movement has compromised (e.g., slowed down, delayed) boot processing and I/O along with early post-boot processing and I/O.

FIG. 1 illustrates a hypervisor 100 running a virtual machine 102. In computer science, a hypervisor is a piece of computer software, firmware, or hardware that creates and runs virtual machines. A hypervisor may also be called a virtual machine monitor (VMM). A computer on which a hypervisor is running a virtual machine may be referred to as a "host machine." The virtual machine running on the hypervisor may be referred to as a "guest machine." A hypervisor provides a virtual operating platform for a guest operating system. The hypervisor also manages execution of the guest operating system. Multiple instances of guest operating systems may share physical hardware resources as virtual resources. A virtual machine (VM) is a software implemented abstraction of a set of underlying computer hardware. VMs are based on the specifications of a hypothetical computer and may, therefore, emulate the computer architecture of a tangible computer, including the functions of the tangible computer.

FIG. 1 illustrates primary data store 112 as a virtualized hardware resource. The primary data store 112 may be associated with different actual hardware devices. In one example, deduplication storage 120 may be the actual hardware resource that supports the virtualized hardware resource. Systems administrators may choose to configure deduplication storage 120 as the primary data store 112 for the virtual machine 102 for a variety of reasons. For example, virtual machines running the same guest operating system may share gigabytes of common data that are efficiently stored in a de-duplicated manner on deduplication storage 120 and data read in when an operating system is booting may be the same for guest operating systems running on a number of virtual machines. These repetitive reads may be handled efficiently by deduplication storage 120.

Backing up copies of virtual machines to the deduplication storage 120 may also be very efficient since many blocks that are common to the guest operating systems will not need to actually be written to the deduplication storage 120 since those duplicate blocks will already be on the deduplication storage 120. Using deduplication storage 120 as the primary data store 112 may also provide efficiencies associated with deduplication replication for offsite disaster recovery. Instead of having to replicate common blocks that are shared by the multiple instances of the guest operating systems on the virtual machines, a single copy of the de-duplicated blocks may be replicated.

Thus, a hypervisor 100 may be configured to support a virtual machine 102 by using a deduplication data storage 120 that supports the primary data store 112. FIG. 2 illustrates a virtual machine (VM) 102 running an operating system 103 that in turn is running an application 104 and an application 105. Initially, when the operating system 103 boots, or when an application starts up, long sequential reads of de-duplicated blocks may occur efficiently from the base disk file 230. However, after boot time, as non-boot processing occurs in the operating system 103 or applications 104 and 105, more random I/O may occur.

Some hypervisors may use virtual machine snapshots to improve the input/output (I/O) characteristics of a virtual machine (VM) that is configured to use a deduplication apparatus as its primary data store. This facilitates using a deduplication storage device as the primary storage for a VM without having the VM experience significant degradation of I/O performance when random I/O is experienced.

FIG. 3 illustrates a hypervisor 300 that is running a virtual machine 302. VM 302 is interacting with a primary data store 312 and a secondary data store 314. Primary data store 312 is supported by a deduplication storage 320 and secondary data store 314 is supported by a non-deduplication storage 330. While a single non-deduplication storage 330 is illustrated, secondary data store 314 may be configured to interact with a plurality of non-deduplication storages.

Hypervisor 300 may allow or cause virtual machine 302 to write a snapshot to secondary data store 314. In one embodiment, hypervisor 300 may be configured to allow or cause VM 302 to write a snapshot to secondary data store 314 by treating secondary data store 314 as an alternate primary storage device. Access to the alternate primary storage device may be achieved by, for example, changing a "working directory" with which the VM 302 is interacting. A VM snapshot may be, for example, a file-based view of the state, disk data, memory, configuration, and other information associated with a VM at a specific point in time. It is possible to take multiple snapshots of a VM. A snapshot may be acquired even while a VM is running. A snapshot may be treated as a whole or may have its contents accessed individually. A snapshot may preserve the state and data of a VM at a specific point in time. The state may include, for example, the VM's power state (on, off, suspended). The data may include, for example, all the files touched by the VM and all the files that make up the VM. The data may also include, for example, information from disks, memory, and other devices touched by the VM.

Hypervisor 300 may write a snapshot of VM 302 to non-deduplication storage 330 via the secondary data store 314. Writing the snapshot to the non-deduplication storage 330, and then selectively satisfying certain I/O from the VM 302 from the non-deduplication storage 330 or from the snapshot, while selectively satisfying other I/O from the deduplication storage 320, facilitates changing and improving the I/O pattern of the VM 302. Non-deduplication storage 330 may be smaller, faster, or more suited to random I/O than deduplication storage 320. For example, deduplication storage 320 may be a tape drive, a large disk, a redundant array of independent disks (RAID), a solid state drive (SSD), a memory or other device while non-deduplication storage 330 may be a disk drive, SSD, or even memory based device. Though the types of devices used for deduplication storage 320 and non-deduplication storage 330 may vary, devices that are more suited to random I/O and non-de-duplicated data and devices that are more suited to sequential I/O and de-duplicated data may be employed. The device more suited to random I/O may be used to store the snapshot and satisfy a post boot I/O load while the device more suited to sequential I/O may be used to store deduplicated blocks and to satisfy the boot I/O load. The snapshot can be used to satisfy the small reads and writes that are frequently repeated or over-written while the deduplication storage 320 can be used to satisfy the large sequential reads associated with booting VM 302 or operating systems or applications launched by VM 302.

FIG. 4 illustrates example I/O when VM 302 has access to a deduplication storage and to a snapshot. VM 302 may run an operating system 303, an application 304, and an application 305. While two applications and one operating system are illustrated, a greater number of applications or operating systems may be employed. When the operating system 303 boots, a large number of reads may be satisfied from base disk file 333, which may be resident in a deduplication storage apparatus. Similarly, when applications 304 or 305 are instantiated, a large number of reads may be satisfied from base disk file 333. However, as the operating system 303 and the applications 304 and 305 run, the more random I/O load described above may be satisfied from snapshot file 340. Using the dual storage approach with selective control of the device from which I/O is satisfied facilitates using the deduplication storage for what the deduplication storage is optimized for and using the snapshot for what the snapshot is optimized for. The dual storage approach facilitates mitigating performance issues associated with either a solely deduplication based approach or solely snapshot based approach.

FIG. 4 illustrates how when a snapshot file 340 is active, in one embodiment, I/O may be handled so that writes will go to the non-deduplication device, reads of newly written data will come from the non-deduplication device, overwrites of newly written data will go to the non-deduplication device, and reads of boot data and data that is not resident in the snapshot or non-deduplication device will go to the deduplication device. Different decisions may be enforced in different embodiments. While boot data is described being read from base disk file 333, VM 302, operating system 303, or applications 304 or 305 may produce some non-boot I/O that is still deduplication-centric and that will, therefore, be satisfied from base disk file 333. I/O that is "deduplication-centric" is I/O that involves reading a block or blocks of data in a manner that is more efficient when read from a deduplication repository than when read from a non-deduplication repository. For example, a collection of blocks that are stored sequentially and contiguously in a deduplication repository and that can be read using a single sequential I/O may also be stored non-sequentially or non-contiguously on a non-deduplication repository from where the blocks would require multiple input/outputs. When all the blocks are desired, the sequential I/O would be deduplication-centric.

The I/O illustrated in FIG. 4 may be efficient for boot and post-boot processing for a normal or generic VM. However, when a VM is being recovered from a backup image, the additional data movement needed to produce the recovery image may affect the otherwise efficient I/O.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
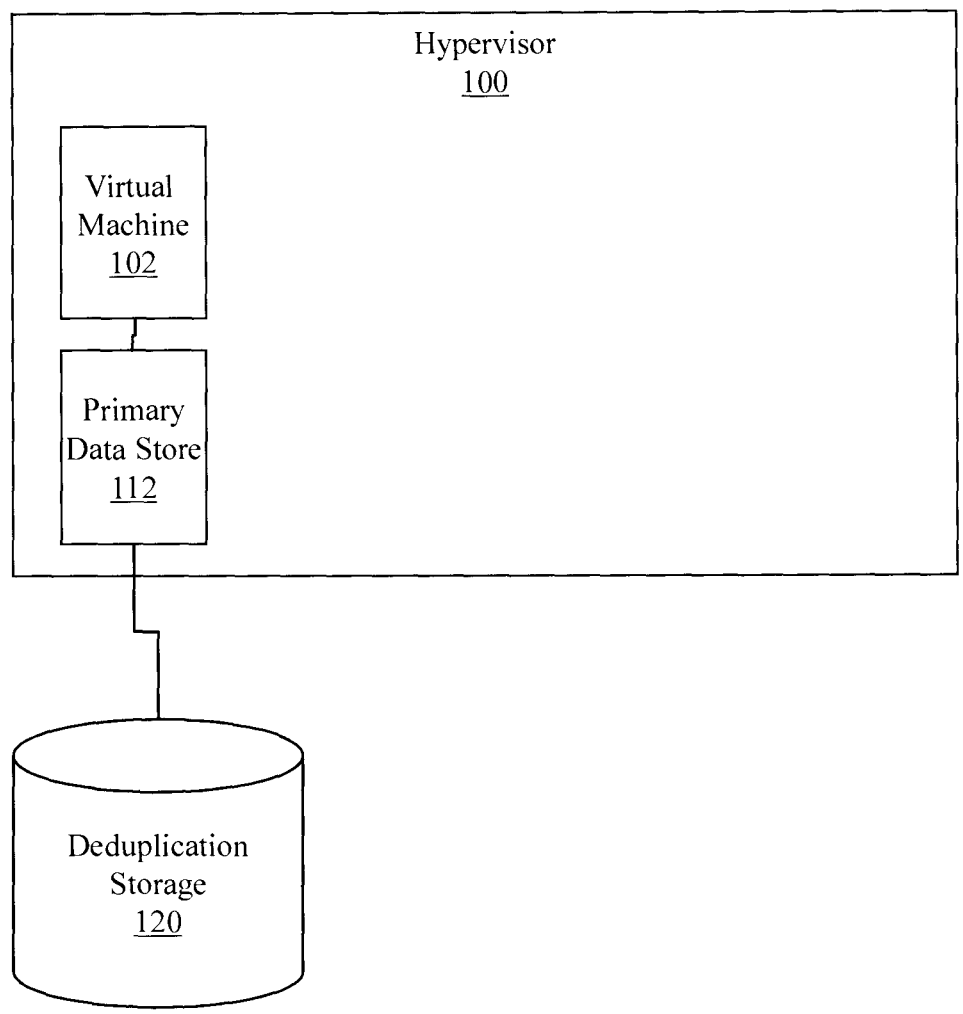
FIG. 1 illustrates an example hypervisor, virtual machine (VM), and primary data store.
Figure 2:
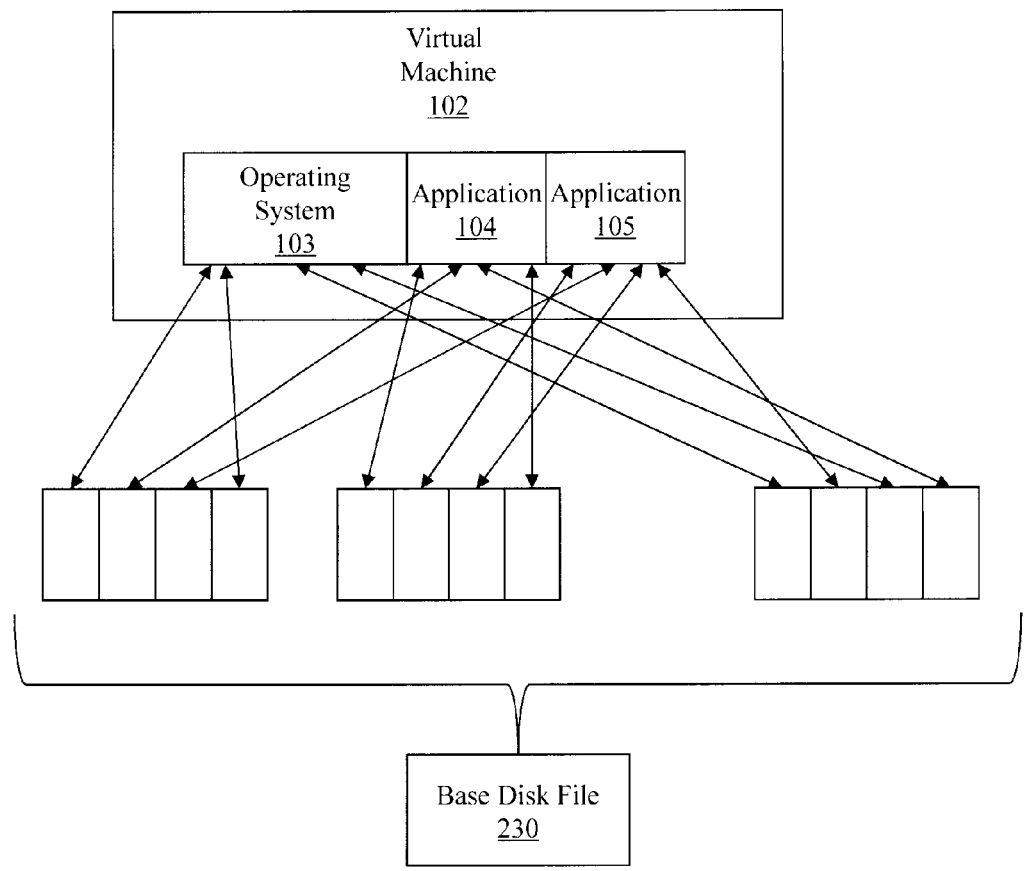
FIG. 2 illustrates an example I/O load associated with a hypervisor, a VM, and a primary data store.
Figure 3:
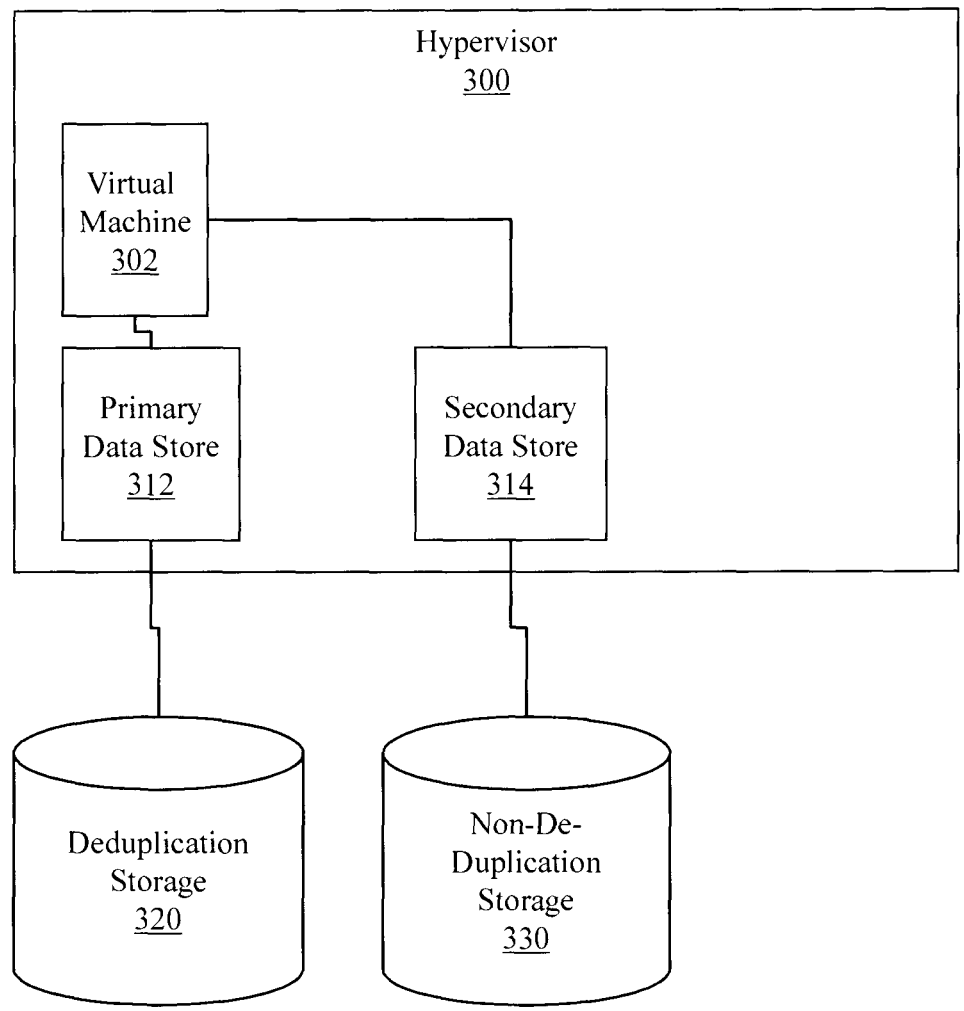
FIG. 3 illustrates a hypervisor, a VM, a primary data store, and a secondary data store.
Figure 4:
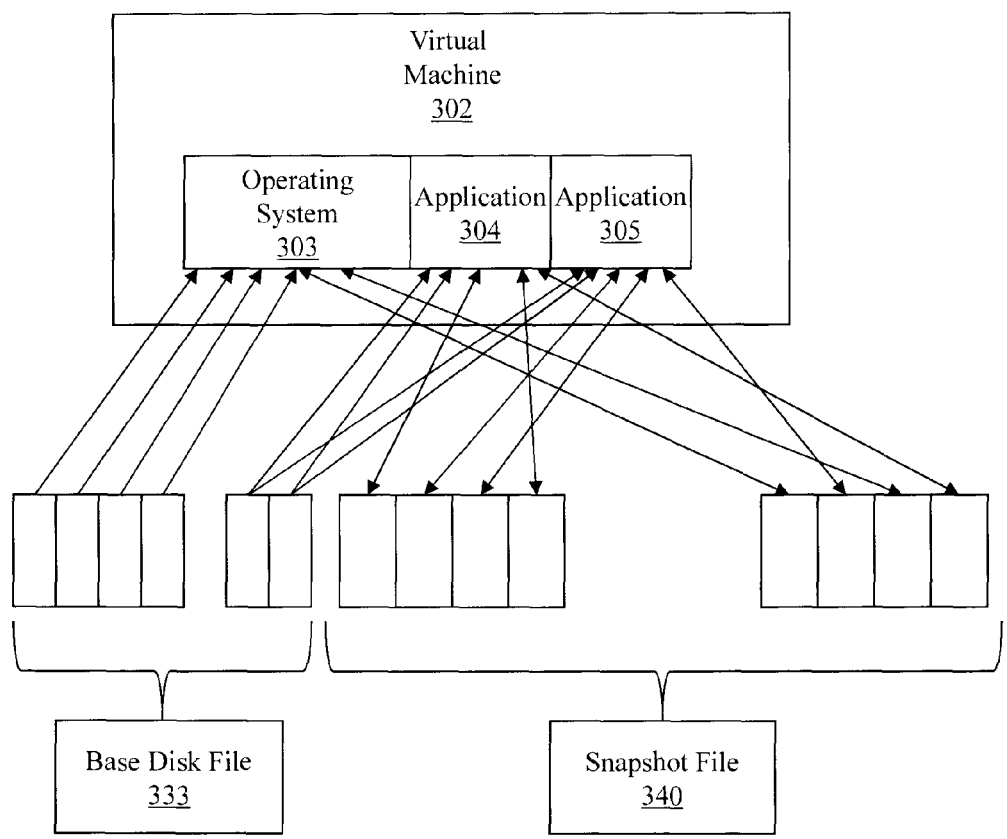
FIG. 4 illustrates an example I/O load associated with a hypervisor, a VM, a primary data store, and a secondary data store.

Example apparatus and methods support fast virtual machine booting using a deduplication device and improved recovery image data movement. Example apparatus and methods improve over conventional systems by accessing, early in the boot process, a deduplication based data store from which data needed to get a VM running is read efficiently. Example apparatus and methods also improve over conventional systems by providing, early in the boot process, a non-deduplication based data store that supports initial random I/O, both reads and writes. The initial deduplication data store to read from and the non-deduplication based data store to support random I/O are provided and in use before data movement required to support a recovery is completed. Thus, rather than waiting until data required to support a recovery has been completely moved to a desired data store, example apparatus and methods allow initial operations using the two initial data stores. Once data required to support a boot or recovery has been moved to the desired data store, the two initial data stores may be released or used in other ways. In different embodiments, the improved recovery image data movement can proceed in parallel with boot data movement or as a background process without compromising the generic boot processing.

Example apparatus and methods facilitate recovering a virtual machine faster by not doing any data movement associated with creating the recovery image at boot time. Instead of making creating the recovery image the first task during VM recovery, example apparatus and methods give the new VM early access to a backup image on a deduplication apparatus. Example apparatus and methods also give the new VM early access to a snapshot on a random I/O device to support initial random I/O. Once the new VM is up and running with read access from the deduplication device backup copy and random I/O available with the snapshot copy, then the data movement associated with creating the recovery image can proceed. The data movement moves the backup image from the deduplication device to a "primary" device. This data movement is performed in a way (e.g., as a background process) that does not compromise reads from the deduplication device or random I/O with the snapshot. Once the data has been moved to the primary device and the recovery image is available, connections can be made from the VM to the primary data storage. Once the connections to the recovery image are made, the connections to the random I/O device snapshot and the dedupe device backup copy can be removed. Thus, example methods and apparatus perform the data movement needed to complete the full recovery while initial processing is being handled from a read copy of the backup image on the deduplication device and a read/write copy available on a random I/O device storing a snapshot.

Recovering a virtual machine is different from creating a new, generic instance of a virtual machine. A new, generic version of a virtual machine has no previous state, data, or information because it has not run before. A VM that is being recovered has run before and thus may have state, data, or other information stored in a backup image. A recovery image of a VM to be recovered may include that state, data, or other information.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 5:
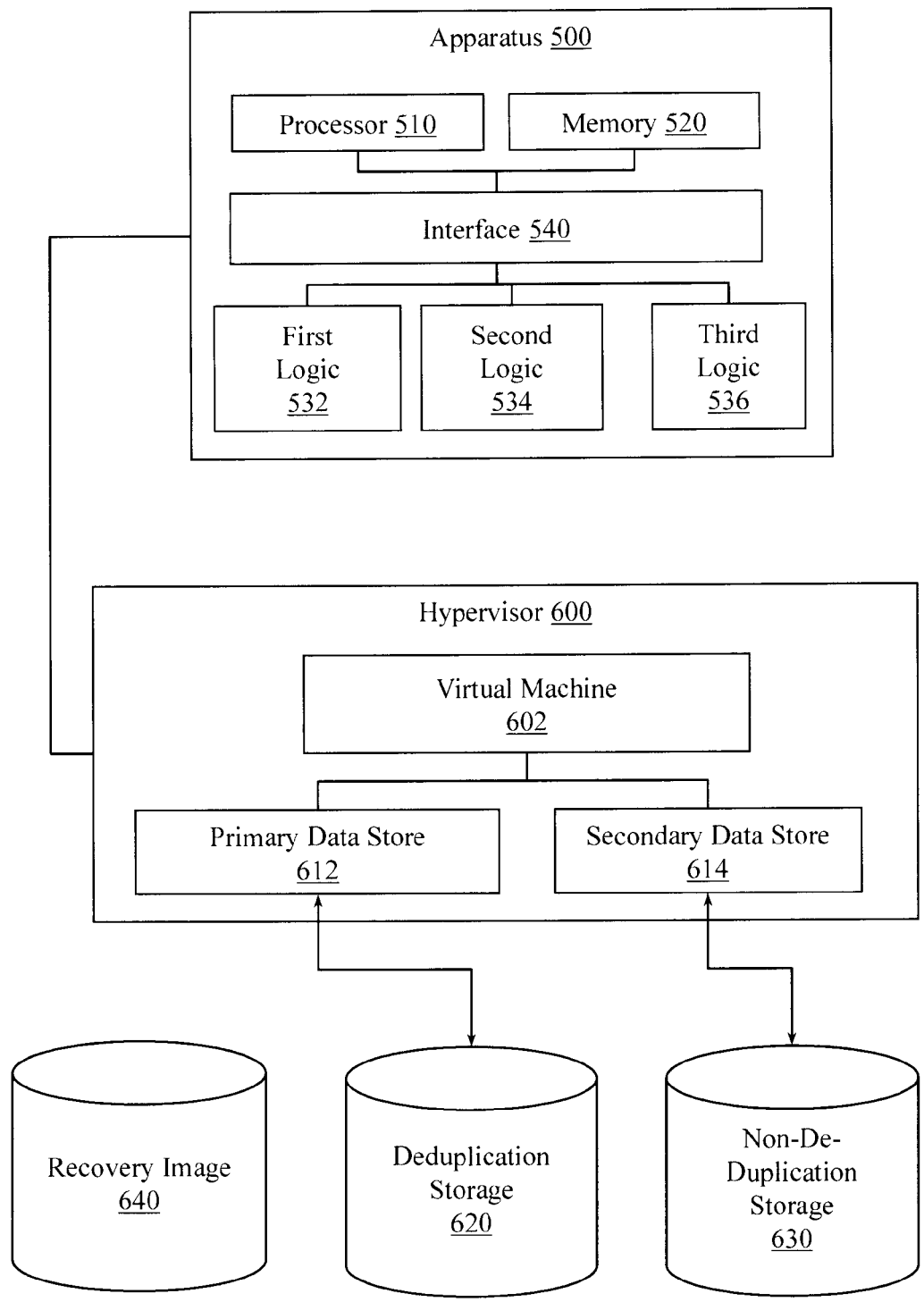
FIG. 5 illustrates an example apparatus associated with virtual machine booting using a deduplication device and improved recovery image data movement.

FIG. 5 illustrates an apparatus 500 that includes a processor 510, a memory 520, and a set of logics that is connected to the processor 510 and memory 520 by an interface 540. The processor 510 may be, for example, a variety of various hardware processors including dual microprocessor and other multi-processor architectures. Memory 520 may include volatile memory and/or non-volatile memory. Non-volatile memory may include, for example, read only memory (ROM), programmable ROM (PROM), and other memory. Volatile memory may include, for example, random access memory (RAM), and other memory.

Processor 510 may run a hypervisor 600. The hypervisor 600 may provide a virtual machine 602. Virtual machine 602 may be supported by a primary data store 612 and a secondary data store 614. The memory 520 may store a process or data. Memory 520 may also store information associated with one or more data storage devices available to the hypervisor 600. The one or more data storage devices may include data deduplication data storage device 620 and non-data deduplication data storage device 630. The set of logics may control input/output with the one or more data storage devices for a recovery process associated with recovering a virtual machine (VM). In one embodiment, a first data storage device (e.g., deduplication storage 620) is part of the apparatus 500 and a second storage device (e.g., non-deduplication storage 630) is part of the apparatus 500. In another embodiment, a first data storage device (e.g., deduplication storage 620) is not part of the apparatus 500 and a second storage device (e.g., non-deduplication storage 630) is not part of the apparatus 500.

Apparatus 500 may include a first logic 532 that provides read access to a backup image from which the VM can be recovered. The backup image is stored on a first data storage device. The first data storage device may be deduplication storage 620. In one embodiment, the first logic 532 provides read access to the backup image by exporting the backup image as a SCSI device or as an NFS device. The first logic 532 may provide read access to the backup image by exporting the backup image as a logical unit (LUN) or by exporting the backup image as a network attached storage (NAS) data store.

Apparatus 500 may also include a second logic 534 that provides read/write access to a snapshot associated with the VM. In one embodiment, the snapshot is stored on a second data storage device different than the first data storage device. The second data storage device may be, for example, the non-deduplication storage 630. Data to be read to boot the VM may be stored on data deduplication storage 620, which is optimized for boot-type reads (e.g., long sequential reads) while data written and read other than the boot data may be stored on non-data deduplication storage 630, which is optimized for random I/O.

Apparatus 500 may also include a third logic 536 that controls the hypervisor 600 during the recovery process. The third logic 536 may control the hypervisor 600 by causing the hypervisor 600 to create a new instance of the VM 602. The new instance of the VM 602 may need generic boot processing, the reads for which can be satisfied from the deduplication storage 620, and may also need recovery specific processing, the reads for which may need to be satisfied from a recovery image 640. Apparatus 500 creates the recovery image 640 in a way that does not slow down the generic boot processing.

The third logic 536 may also control the hypervisor 600 by causing reads associated with creating the new instance of the VM 602 to be directed to the first data storage device (e.g., deduplication storage 620). Reads associated with creating the new instance of the VM 602 may include long sequential reads of generic VM boot data (e.g., operating system files, file system data, files). Deduplication storage 620 may be optimized for storing and providing this generic VM boot data.

The third logic 536 may also control the hypervisor 600 by causing reads and writes generated by the new instance of the VM 602 to be handled by the snapshot stored on the non-deduplication storage 630. While much of the boot processing may involve long sequential reads, boot processing and then processing performed after the boot may involve random I/O. Rather than inefficiently supporting random I/O using the deduplication storage 620, the snapshot on the non-deduplication storage 630 may support the random I/O.

The third logic 536 may also control the hypervisor 600 to create the recovery image 640 by causing the backup image to be moved from the first data storage to a primary data store associated with the new instance of the VM. The recovery image 640 may be created without delaying reads associated with booting the new instance of the VM from the first data storage device and without delaying reads or writes to the snapshot. Conventionally, a recovery process would not allow any processing until the recovery image 640 was complete. However, much of the boot processing and even post-boot processing does not depend on having the recovery image 640 complete. Therefore, apparatus 500 supports the hypervisor 600 and virtual machine 602 with the deduplication storage 620 and non-deduplication storage 630 so that processing and I/O that does not depend on the recovery image 640 being complete can proceed. This improves on conventional systems by making the boot processing faster and by allowing non-recovery dependent operations to begin sooner.

Upon determining that the recovery image 640 is ready for use by the new VM 602, the third logic 536 may control the hypervisor 600 to redirect input/output for the new VM 602 to the recovery image 640. In one embodiment, the third logic 536 may control the hypervisor 600 or the new instance of the VM 602 to delete the snapshot upon determining that the recovery image 640 is ready for use by the new instance of the VM 602 and that reads and writes for the new instance of the VM 602 have been redirected to the recovery image 640.

The third logic 536 may cause the data to be moved from the first data storage to the primary data store in different ways. In one embodiment, the third logic 536 may control the hypervisor 600 to move the data from the first data storage to the primary data store to create the recovery image 640. In another embodiment, the third logic 536 may control the hypervisor 600 to control the new instance of the VM 602 to use a background process to move the data from the first data storage to the primary data store to create the recovery image 640. Having the hypervisor 600 move the data or having the data moved as a background process by the virtual machine 602 facilitates improving the boot process associated with recovering a VM by not delaying boot reads or initial random I/O while the recovery image is built.

Figure 6:
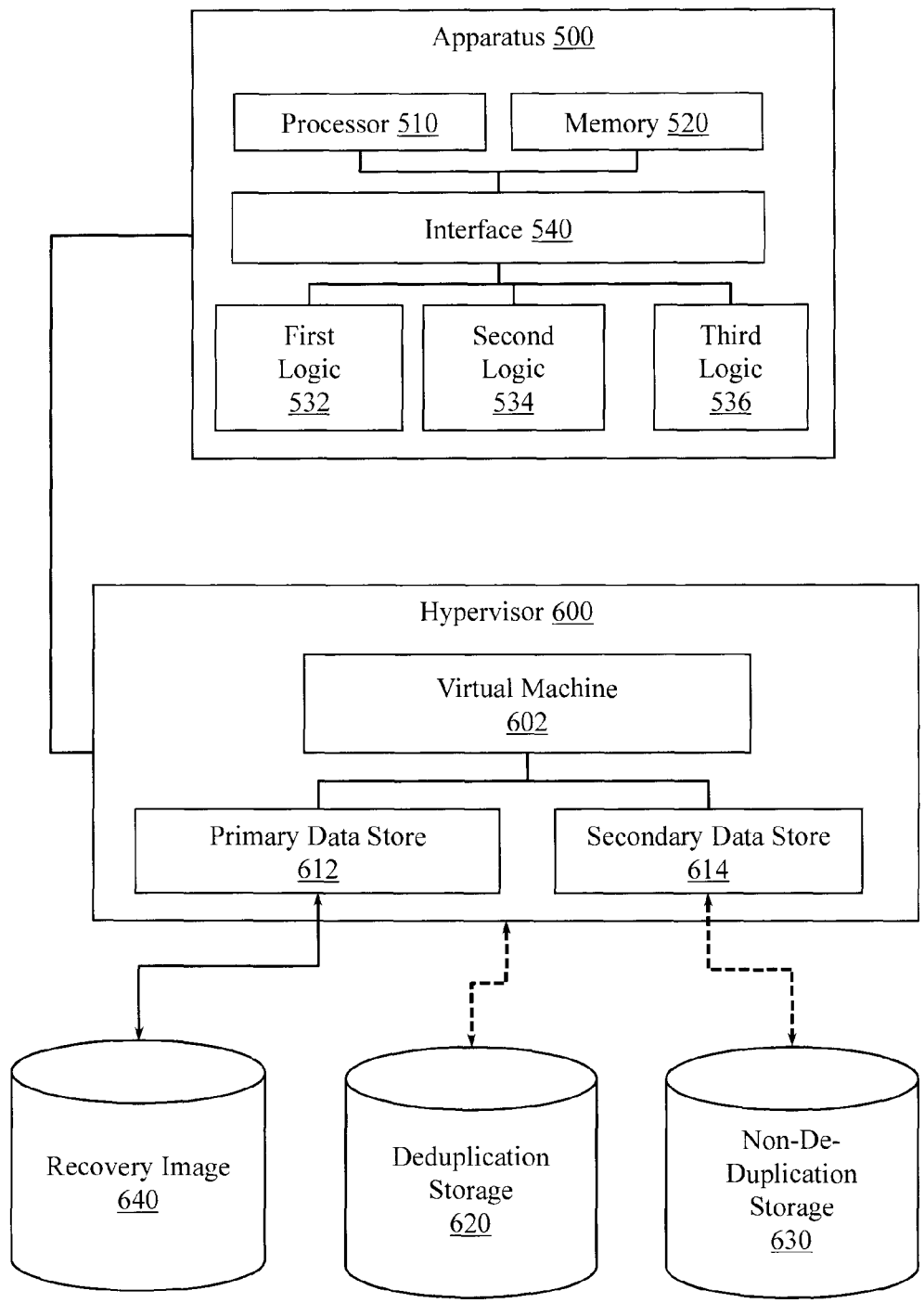
FIG. 6 illustrates an example apparatus associated with virtual machine booting using a deduplication device and improved recovery image data movement.

FIG. 6 illustrates another embodiment of apparatus 500 after the recovery image 640 has been created and is ready for use. In FIG. 6, the hypervisor 600 is running virtual machine 602. Virtual machine 602 had been using deduplication storage 620 and non-deduplication storage 630 during boot processing and immediately after booting while the recovery image 640 was created and made available. When the recovery image 640 is available, the hypervisor 600 may cause virtual machine 602 to perform I/O with the recovery image 640 instead of with the deduplication storage 620 or the non-deduplication storage 630. In one embodiment, the hypervisor 600 or virtual machine 602 may delete the snapshot on non-deduplication storage 630. In one embodiment, the hypervisor 600 or virtual machine 602 may allow the virtual machine 602 to maintain relationships with the deduplication storage 620 or non-deduplication storage 630.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 7:
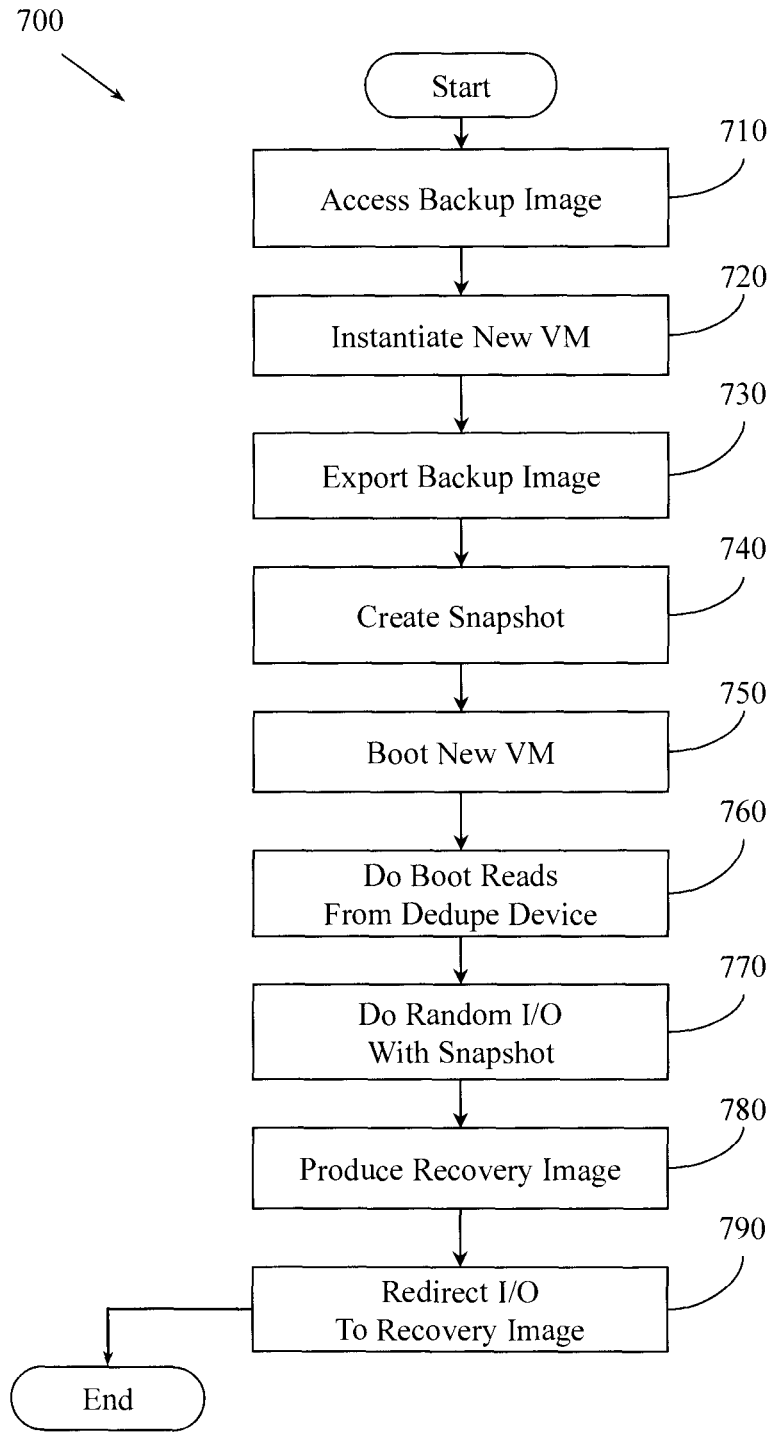
FIG. 7 illustrates an example method associated with virtual machine booting using a deduplication device and improved recovery image data movement.

FIG. 7 illustrates a method 700 for controlling input/output associated with a boot process associated with recovering a virtual machine (VM). Method 700 includes, at 710, accessing a backup image associated with the VM to be recovered. Accessing the backup image may include receiving a pointer to the backup image, receiving an address to the backup image, receiving an identifier of a backup image, or other computer based action. The backup image is stored on a deduplication data store and thus certain reads performed to boot a VM may be performed efficiently. Simply accessing the backup image does not cause data movement typically associated with creating a recovery image and thus there is no delay produced as in conventional systems.

Method 700 also includes, at 720, controlling a hypervisor to instantiate a new VM. Instantiating the new VM may include allocating resources (e.g., memory, disk, processor time) for the VM. Controlling the hypervisor at 720 may include sending a signal to the hypervisor to create a new VM, making a procedure call or function call that causes the VM to be created, or other computer based action. Once again, data movement typically associated with creating a recovery image has not yet occurred so method 700 has not produced additional delays in recovering a VM. Indeed, method 700 has operated without delays which reduces the startup time typically associated with recovering a VM.

Method 700 also includes, at 730, making the backup image available to the hypervisor. In one embodiment, making the backup image available to the hypervisor at 730 includes associating the backup image with the hypervisor as a small computer system interface (SCSI) data store or as a network attached storage (NAS) protocol (e.g., network file system (NFS), common internet file system (CIFS)) data store. Associating the backup image with the hypervisor as a SCSI data store may involve exporting the backup image as a logical unit (LUN). Associating the backup image with the hypervisor as an NFS data store may involve exporting the backup image as a network attached storage (NAS) data store. Making the backup image available to the hypervisor still has not caused data movement typically associated with recovering a VM and thus delays associated with VM recovery have been mitigated or reduced.

Method 700 also includes, at 740, creating a snapshot of the new VM. The snapshot is created on a non-deduplication data store that efficiently supports random I/O. The snapshot may be used to support random I/O during the boot process and even after the boot process. Long sequential reads and other boot reads may be efficiently performed from a deduplication data store on which the backup image is stored and random I/O may be efficiently performed using the snapshot. At this point, the new VM has access to a deduplication data storage to read data from and a snapshot on a random I/O device to support I/O. The VM can, therefore, continue with a boot process associated with recovering a VM even though the recovery image has not yet been created. Using two different data stores, each of which performs a certain type of I/O efficiently during the boot process, method 700 may read and boot more quickly than conventional VM recovery process.

Method 700 also includes, at 750, controlling the new VM to begin a boot process. Controlling the VM to begin a boot process may include sending the VM a message, making a procedure or function call, placing a value in a computer memory, or other computer based action. Unlike conventional systems, the boot process can begin without having the recovery image available, which improves boot performance.

Method 700 also includes, at 760, controlling the new VM to read data related to the boot process from the backup image. The data related to the boot process may be, for example, operating system information, file system information, files, and other data that has been deduplicated and stored in a manner that can be read efficiently from a deduplication data store. Since the data related to the boot process is coming from a deduplication data store, the data related to the boot process may be read efficiently.

Method 700 also includes, at 770, controlling the new VM to use the snapshot for input/output for data that is not read data related to the boot process. Data that may be input/output during the boot process or even after the boot process may include addresses associated with the hypervisor, addresses associated with data communications, time of day information, security information, or other information. Since the random I/O will not be performed with the deduplication store, the random I/O may be performed efficiently. Neither reading the boot data at 760 nor performing the random I/O at 770 are delayed by creating the recovery image associated with recovering the VM. Conventional systems may have required that the recovery image be completed before the boot process could begin or finish.

Method 700 also includes, at 780, producing a recovery image of the VM to be recovered. The recovery image may be created in a primary data store associated with the new VM. The recovery image may be created by copying data from the backup image to the primary data store. Copying data from the backup image to the primary data store can be performed as a background process or in other ways that do not delay doing boot reads at 760 or doing boot related random I/O at 770. In one embodiment, copying data from the backup image to the primary data store to produce the recovery image is performed as a background process by the new VM. In another embodiment, producing the recovery image by copying data from the backup image to the primary data store is performed by the hypervisor without requiring actions by the new VM. Thus, method 700 improves on conventional systems that may delay reads or random I/O until a recovery image is complete and available by establishing relationships with data stores that support the boot reads and random I/O and handling creating the recovery image separately.

Method 700 also includes, at 790, upon determining that the recovery image is complete and available in the primary data store, redirecting I/O to use the recovery image. Redirecting the I/O may include controlling the new VM to perform input/output with the recovery image in the primary data store and controlling the new VM to not perform input/output with the snapshot.

When the recovery image is complete and available, method 700 may include controlling the new VM to delete the snapshot or controlling the hypervisor to delete the snapshot. In one embodiment, the hypervisor or VM may decide to maintain relationships with the snapshot to support certain types of I/O.

Figure 8:
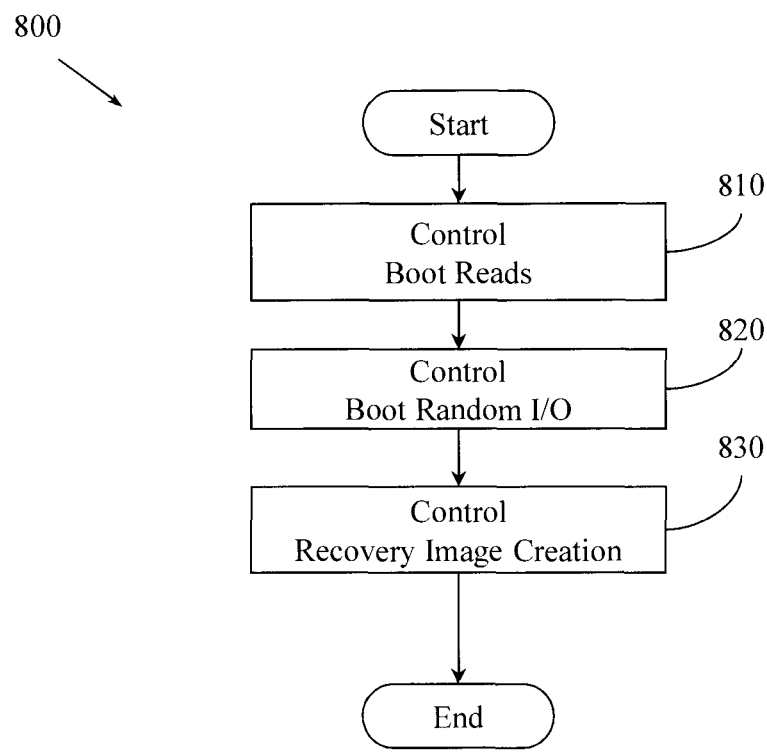
FIG. 8 illustrates an example method associated with virtual machine booting using a deduplication device and improved recovery image data movement.

FIG. 8 illustrates a method 800 for improving the performance of a computer by reducing the boot time associated with recovering a virtual machine. Method 800 includes, at 810, controlling the computer to perform reads of boot data associated with recovering the virtual machine from a data deduplication data store. The reads of boot data associated with recovering the virtual machine may be generic boot reads that may be performed efficiently from a deduplication data store. Boot reads may involve reading large amounts of file system information, operating system information, and other information.

Method 800 also includes, at 820, controlling the computer to perform boot-related random input/output associated with recovering the virtual machine with a virtual machine snapshot. Boot-related random I/O may include establishing virtual memory addresses, establishing attachment point addresses, establishing current values for various resources (e.g., available memory, available processes), or other actions. Since the boot-related random I/O is random, the virtual machine snapshot is not located on the data deduplication data store but rather is stored on a device that performs random I/O more efficiently. Two different data stores are used to support the boot processing associated with recovering a VM.

Method 800 includes, at 830, controlling the computer to create a recovery image for the virtual machine without disrupting the reads of boot data from the data deduplication data store and without disrupting the boot-related random input/output with the virtual machine snapshot. Disruptions may be avoided by performing boot processing and even post boot processing with the data deduplication data store and the snapshot while the recovery image is created using other channels, data stores, processors, processes, or other computer assets. Rather than use the primary data store or secondary data store associated with the VM being recovered to create the recovery image, the recovery image can be created while the primary data store as supported by the data deduplication data store and the second data store as supported by the snapshot support the boot.

In one embodiment, upon determining that the recovery image is available, method 800 may control the computer to start performing input/output with the recovery image and to stop performing random input/output with the snapshot. Recovery related I/O that has been handled by the snapshot may be reconciled with the recovery image. Rather than wait for the recovery image to be created, some recovery related I/O may be performed using the snapshot during the boot process. This improves on conventional systems that may need to wait until after the recovery image is available to do any recovery related processing.

In one example, a method may be implemented as computer executable instructions. Thus, in one example, a computer-readable storage medium may store computer executable instructions that if executed by a machine (e.g., processor) cause the machine to perform method 700 or 800 or other methods described herein. While executable instructions associated with method 800 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
a processor that runs a hypervisor;
a memory that stores information associated with one or more data storage devices available to the hypervisor;
a set of logics that control input/output with the one or more data storage devices for a recovery process associated with recovering a virtual machine (VM); and
an interface that connects the processor, the memory, and the set of logics,
the set of logics comprising:
a first logic that provides read access to a backup image from which the VM will be recovered, where the backup image is stored on a first data storage device;
a second logic that provides read/write access to a snapshot associated with the VM, where the snapshot is stored on a second data storage device, where the second data storage device is a device other than the first data storage device, and
a third logic that controls the hypervisor during the recovery process, wherein the recovery process includes:
the hypervisor creating a new instance of the VM,
directing reads associated with creating the new instance of the VM to the first data storage device,
the snapshot handling reads and writes generated by the new instance of the VM,
moving the backup image from the first data storage to a primary data store associated with the new instance of the VM to create the recovery image without delaying reads associated with booting the new instance of the VM from the first data storage device and without delaying reads or writes to the snapshot, and upon determining that the recovery image is ready for use by the new VM, redirecting input/output for the new VM to the recovery image.

2. The apparatus of claim 1, where the first data storage device is a data deduplication data storage device.

3. The apparatus of claim 2, where the second data storage device is not a data deduplication data storage device.

4. The apparatus of claim 3, where the first data storage device is part of the apparatus and the second storage device is part of the apparatus.

5. The apparatus of claim 3, where the first data storage device is not part of the apparatus and the second storage device is not part of the apparatus.

6. The apparatus of claim 3, where the first logic provides read access to the backup image by exporting the backup image as a SCSI device or as an NFS device.

7. The apparatus of claim 3, where the first logic provides read access to the backup image by exporting the backup image as a logical unit (LUN) or by exporting the backup image as a network attached storage (NAS) data store.

8. The apparatus of claim 3, where the third logic controls the hypervisor or the new instance of the VM to delete the snapshot upon determining that the recovery image is ready for use by the new instance of the VM and that reads and writes for the new instance of the VM have been redirected to the recovery image.

9. The apparatus of claim 3, where the third logic controls the hypervisor to move the data from the first data storage to the primary data store to create the recovery image.

10. The apparatus of claim 3, where the third logic controls the hypervisor to control the new instance of the VM to move the data from the first data storage to the primary data store to create the recovery image as a background process.

* * * * *